(12) United States Patent
Hu et al.

(10) Patent No.: US 11,940,389 B2
(45) Date of Patent: Mar. 26, 2024

(54) DEVICE FOR RECOGNIZING DEFECTS IN FINISHED SURFACE OF PRODUCT

(71) Applicant: Fu Tai Hua Industry (Shenzhen) Co., Ltd., Shenzhen (CN)

(72) Inventors: Liu-Bin Hu, Shenzhen (CN); Wei Yang, Shenzhen (CN)

(73) Assignee: Fu Tai Hua Industry (Shenzhen) Co., Ltd., Shenzhen (CN)

( * ) Notice: Subject to any disclaimer, the term of this patent is extended or adjusted under 35 U.S.C. 154(b) by 232 days.

(21) Appl. No.: 17/551,526

(22) Filed: Dec. 15, 2021

(65) Prior Publication Data
US 2022/0373470 A1    Nov. 24, 2022

(30) Foreign Application Priority Data
May 19, 2021 (CN) .......................... 202121073955.1

(51) Int. Cl.
*G01N 21/88* (2006.01)
*G06T 7/00* (2017.01)
*G01N 21/89* (2006.01)

(52) U.S. Cl.
CPC ..... *G01N 21/8806* (2013.01); *G01N 21/8803* (2013.01); *G06T 7/0004* (2013.01);
(Continued)

(58) Field of Classification Search
CPC ......... G06T 7/0004; G06T 2207/30108; G06T 2207/30164; G06T 2207/30136; G01N 21/8806; G01N 21/8803; G01N 21/89; G01N 21/8901; G01N 21/8903; G01N 21/8914; G01N 21/8921; G01N 21/8922; G01N 21/956; G01N 21/95607; G01N 21/95684; G01N 21/95; G01N 21/86; G01N 21/88; G01N 21/892; G01N 2021/8841; G01N 2021/888; G01N 2021/8887;
(Continued)

(56) References Cited

U.S. PATENT DOCUMENTS 5,550,946 A * 8/1996 Muehlemann ........... G02B 6/04
362/556
6,598,994 B1 * 7/2003 Tait ..................... G01N 21/8806
362/249.05

(Continued)

FOREIGN PATENT DOCUMENTS

| AT | 12106 U1 * | 8/2011 | .......... G01B 11/303 |
| CN | 107228861 A * | 10/2017 | ......... G01N 21/8914 |

(Continued)

*Primary Examiner* — Gordon J Stock, Jr.
(74) *Attorney, Agent, or Firm* — ScienBiziP, P.C.

(57) ABSTRACT

A device to detect and analyze defects in magnified scale images of a surface of a finished product illuminated with a blue light source and viewed by multiple image-capturing devices each focused on their own spot includes a supporting mechanism, a transmitting mechanism, a detecting mechanism, and a processor. The transmitting mechanism carries and transmits the product. The detecting mechanism includes a detecting frame, a blue light source assembly. The processor is used to connect to a camera assembly, and preprocess the image of the front of the product to obtain a detection and analysis of any defects of the front of the product.

18 Claims, 4 Drawing Sheets

(52) U.S. Cl.
CPC ............... *G01N 2021/8841* (2013.01); *G01N 2021/8918* (2013.01)

(58) Field of Classification Search
CPC ... G01N 2021/8908; G01N 2021/8918; G01N 2021/8924; G01N 2021/8925; G01N 2021/845; G01N 2021/8472; G01N 2021/8609; G01N 2021/8645; G01N 2021/8654
See application file for complete search history.

(56) References Cited

U.S. PATENT DOCUMENTS

| | | | |
|---|---|---|---|
| 8,388,204 B2* | 3/2013 | Case | G01N 21/9501 362/558 |
| 8,670,031 B2* | 3/2014 | Case | G01N 21/8806 382/150 |
| 9,646,372 B2* | 5/2017 | Srocka | G06T 7/70 |
| 10,375,285 B2* | 8/2019 | Johnson | G06T 7/001 |
| 10,887,500 B2* | 1/2021 | Wu | G06T 7/0004 |
| 11,209,267 B2* | 12/2021 | Zhao | G01N 21/88 |
| 11,249,029 B2* | 2/2022 | Hu | G01N 21/8851 |
| 11,692,944 B2* | 7/2023 | Hirooka | G01N 21/892 356/237.2 |
| 2018/0165820 A1* | 6/2018 | Rhodes, Jr. | G01N 21/01 |
| 2022/0373469 A1* | 11/2022 | Hu | G06T 7/001 |
| 2022/0373474 A1* | 11/2022 | Hu | G06T 7/001 |
| 2022/0375061 A1* | 11/2022 | Hu | G01N 21/8851 |

FOREIGN PATENT DOCUMENTS

| | | | |
|---|---|---|---|
| CN | 212378695 U | * | 1/2021 |
| CN | 112345541 A | * | 2/2021 |
| CN | 112461131 A | * | 3/2021 |
| CN | 214502366 U | * | 10/2021 |

* cited by examiner

DEVICE FOR RECOGNIZING DEFECTS IN FINISHED SURFACE OF PRODUCT

TECHNICAL FIELD

The present disclosure relates to manufacturing.

BACKGROUND

Aluminum alloy in particular is used as the base material of many electronic products because of the alloys have characteristics such as malleability, easy processing, light weight, and slow rate of corrosion. During the processing, manufacturing and transportation of products, defects such as dirt, crush, multi material, scratch, cross bar color difference, watermark, deformation, black line, scratch, bright spot, bright line, embossing, pitting, stamping die, can be easily formed.

When inspecting the product surface, human visual inspections may be used to determine whether there are defects on the product surface and the types of defects. Such manual detection methods has high labor cost and low efficiency.

Therefore, improvement is desired.

DETAILED DESCRIPTION

Figure 1:
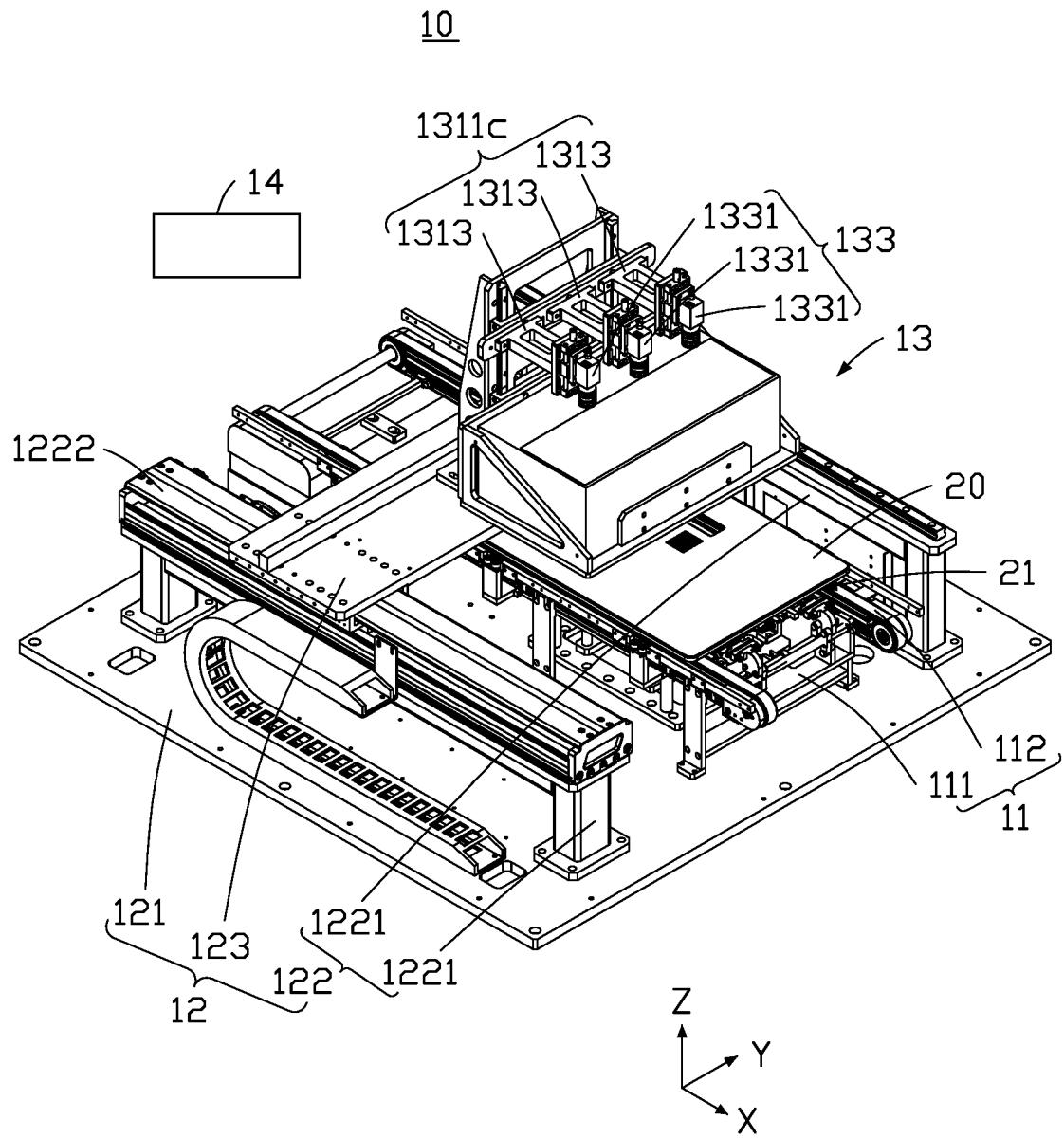
FIG. 1 is a schematic diagram of a detecting device according to an embodiment of the present disclosure.

The technical solutions in the embodiments of the present disclosure will be described in conjunction with the accompanying drawings in the embodiments of the present disclosure. Obviously, the described embodiments are part of the embodiments of the present disclosure, not all of them. Based on the embodiments of the present disclosure, all other embodiments obtained by those of ordinary skill in the art without creative work shall fall within the protection scope of the present disclosure.

In the description of the present disclosure, it should be understood that the azimuth or positional relationship indicated by the terms "center", "longitudinal", "transverse", "length", "width", "thickness", "upper", "lower", "front", "rear", "left", "right", "vertical", "horizontal", "top", "bottom", "inner", "outer", "clockwise" and "counterclockwise", is based on the azimuth or positional relationship shown in the attached drawings, which are only for the convenience of describing the present disclosure and simplifying the description, rather than indicating or implying that the device or element must have a specific orientation, be constructed and operated in a specific orientation, so it cannot be understood as a limitation of the present disclosure.

The terms "first" and "second" are only used for descriptive purposes and cannot be understood as indicating or implying relative importance or implicitly indicating the number of indicated technical features. Thus, the features defining "first" and "second" may explicitly or implicitly include one or more of the features. In the description of the present disclosure, "multiple" means two or more, unless otherwise expressly and specifically defined.

In the description of the present disclosure, it should be noted that, unless otherwise clearly specified and limited, the terms "install", "connect" and "connection" should be understood in a broad sense, for example, it can be fixed connection, removable connection, or integrated connection. It can be mechanical connection, electrical connection or mutual communication. It can be directly connected or indirectly connected through an intermediate medium. It can be a connection within two elements or the interaction relationship between two elements.

In the present disclosure, unless otherwise expressly provided and limited, the first feature "above" or "below" of the second feature may include direct contact between the first and second features, or the first and second features may not be in direct contact, but through another feature between them. Moreover, the first feature being "above", "above" and "above" of the second feature, includes the first feature being directly above and obliquely above the second feature, or only indicates that the horizontal height of the first feature is higher than the second feature. The first feature being "below", and "below" the second feature, includes the first feature being directly above and obliquely above the second feature, or only indicates that the horizontal height of the first feature is less than that of the second feature.

The following disclosure provides many different embodiments or examples to implement different structures of the present application. In order to simplify the disclosure of the present application, the components and settings of specific examples are described below. Of course, they are merely examples and are not intended to limit the present application. In addition, the present application may repeat reference numbers and reference letters in different examples for the purpose of simplification and clarity, which itself does not indicate the relationship between the various embodiments and settings discussed.

FIG. 1 illustrates a detecting device 10 in accordance with an embodiment of the present disclosure.

The detecting device 10 is used to detect, on the front side (front 21) of a product 20, dirt, crushing, multiple materials, scratches, cross bar color differences, watermarks, deformations, black lines, bright spots, bright lines, embossing, pittings, stamping dies and other defects. The product 20 has a square structure, a length direction of the product 20 arranged on the detecting device 10 is defined as a first direction, a width direction of the product 20 is defined as a second direction, and the second direction is perpendicular to the first direction. The product 20 can be an electronic device, such as mobile phone or tablet. The upper side of product 20, that is, the front 21, is the side of the product 20 viewed by a user in normal use.

Figure 2:
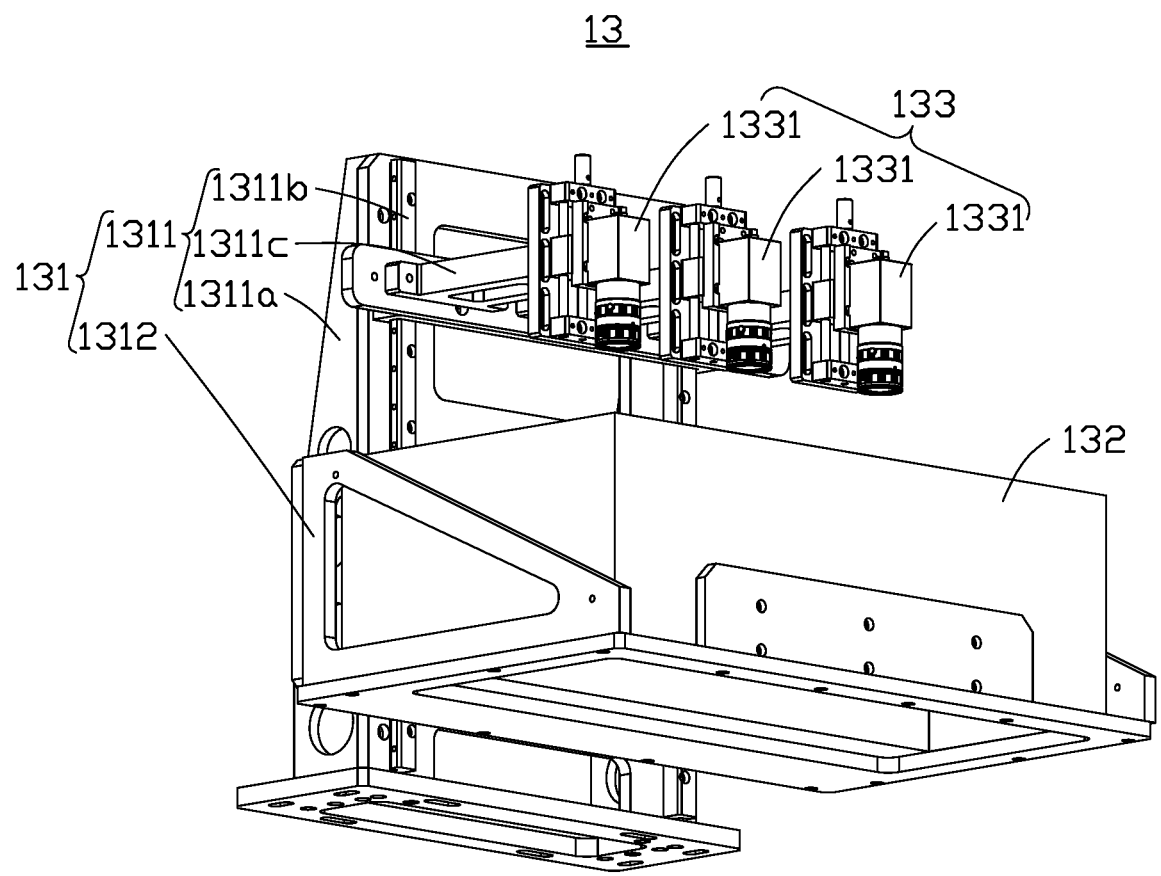
FIG. 2 is a schematic diagram of a detecting mechanism according to an embodiment of the present disclosure.

Referring to FIG. 2, the detecting device 10 includes a transmitting mechanism 11, a supporting mechanism 12, a detecting mechanism 13, and a processor 14. The transmitting mechanism 11 is used to carry and transmit the product 20. The transmitting mechanism 11 is arranged on the supporting mechanism 12. The detecting mechanism 13 includes a detecting frame 131, a blue light source 132, and a camera assembly 133. The detecting frame 131 is arranged on the supporting mechanism 12 to move in the first direction and the second direction, and the blue light source 132 is connected to the detecting frame 131. The light emitted by the blue light source 132 is perpendicular to the front 21 of the product 20 and covers the front 21 of the product 20. The camera assembly 133 includes a plurality of camera members 1331. The camera members 1331 are arranged in sequence along the second direction, and the image-capturing orientation of the camera members 1331 is perpendicular to the front 21 of the product 20, which is used to obtain the image of the front 21 of the product 20 under the light emitted by the blue light source 132. The processor 14 is connected to the camera members 1331, and the processor 14 is used to process the image of the product 20 to obtain the analysis of the front 21 of the product 20. The camera member 1331 can be an array of cameras over an area.

The detecting device 10 uses the camera member 1331 to obtain the image of the front 21 of the product 20 under the blue light source 132. The detecting device 10 processes the obtained image through the processor 14. Therefore, the detecting device 10 uses the plurality of the camera members 1331 to cooperate with blue light source 132, to obtain the image of the front 21 of the product 20, and uses the processor 14 to automatically identify defects such as the above on the front 21 of the product 20, which improves the accuracy of analysis and saves labor cost.

The above processing of the image obtained by the processor 14 is the comparing of the obtained image with the standard image prestored in the processor 14, by using the discrimination model in the processor, so as to determine the above defects in the image. The general formation process of the discrimination model is to train the computer to learn the above defects on the front 21 of the product 20 (for example, features showing defects in an image), establish a learning model for the learned content, and render the learned image information into a standard image library stored in the processor 14, and a discrimination model for determining positive defects of products, established according to the standard image database. The processor 14 may be a microcomputer.

In one embodiment, the supporting mechanism 12 includes a supporting platform 121, a supporting frame 122, and a moving member 123. The transmitting mechanism 11 is arranged on the supporting platform 121. The supporting frame 122 is connected to the supporting platform 121, and the supporting frame 122 includes two gantry carriages 1221 arranged symmetrically. The two gantry carriages 1221 extend along the first direction, and each gantry carriage 1221 is provided with a guiding rail 1222. The moving member 123 is slidably connected to the guiding rail 1222, and the detecting frame 131 is slidably connected to the moving member 123.

The supporting platform 121 can be connected to an external device to cooperate with the detecting device 10 to complete the operation.

In one embodiment, the transmitting mechanism 11 includes a transmitting bracket 111 and a transmitting belt 112. The transmitting bracket 111 is arranged on the supporting platform 121 between two gantry carriages 1221. After the product 20 is placed on the transmitting belt 112, the length direction of the product 20 is consistent with the transmission direction of the transmitting belt 112. The transmitting bracket 111 and the transmitting belt 112 can be extended on the supporting platform 121 according to actual needs to adapt to the external device and cooperate with the detecting device 10 to complete the operation.

In one embodiment, the detecting frame 131 includes a first detecting rack 1311, and a second detecting rack 1312. The first detecting rack 1311 is connected to the moving member 123, and the camera members 1331 are connected to the first detecting rack 1311. The second detecting rack 1312 is slidably connected with the first detecting rack 1311 along the third direction, the blue light source 132 is arranged on the second detecting rack 1312, the third direction, the first direction, and the second direction all being perpendicular to each other. The first detecting rack 1311 includes a first detecting rod 1311a, a detecting track 1311b, and an adjusting member 1311c. The first detecting rod 1311a is connected to the moving member 123, the detecting track 1311b is connected to the first detecting rod 1311a, and the extension direction of the detecting track 1311b is consistent with the third direction. One end of the adjusting member 1311c is slidably connected to the detecting track 1311b, and the other end of the adjusting member 1311c is connected to the camera members 1331. In the embodiment, as shown in FIG. 1 and FIG. 2, the adjusting member 1311c includes three equivalent adjusting blocks 1313, and the number of the camera members 1331 is three, and each adjusting block 1313 is connected to one camera member 1331.

The second detecting rack 1312 is slidably connected to the detecting track 1311b by a hollow rectangular structure. The blue light source 132 is arranged on the second detecting rack 1312.

The first direction is the extension direction of the guiding rail 1222, the X axis in FIG. 1. The second direction is the extension direction of the moving member 123, the Y axis in FIG. 1. The third direction is the extension direction of the detecting track 1311b, the Z axis in FIG. 1.

Figure 3:
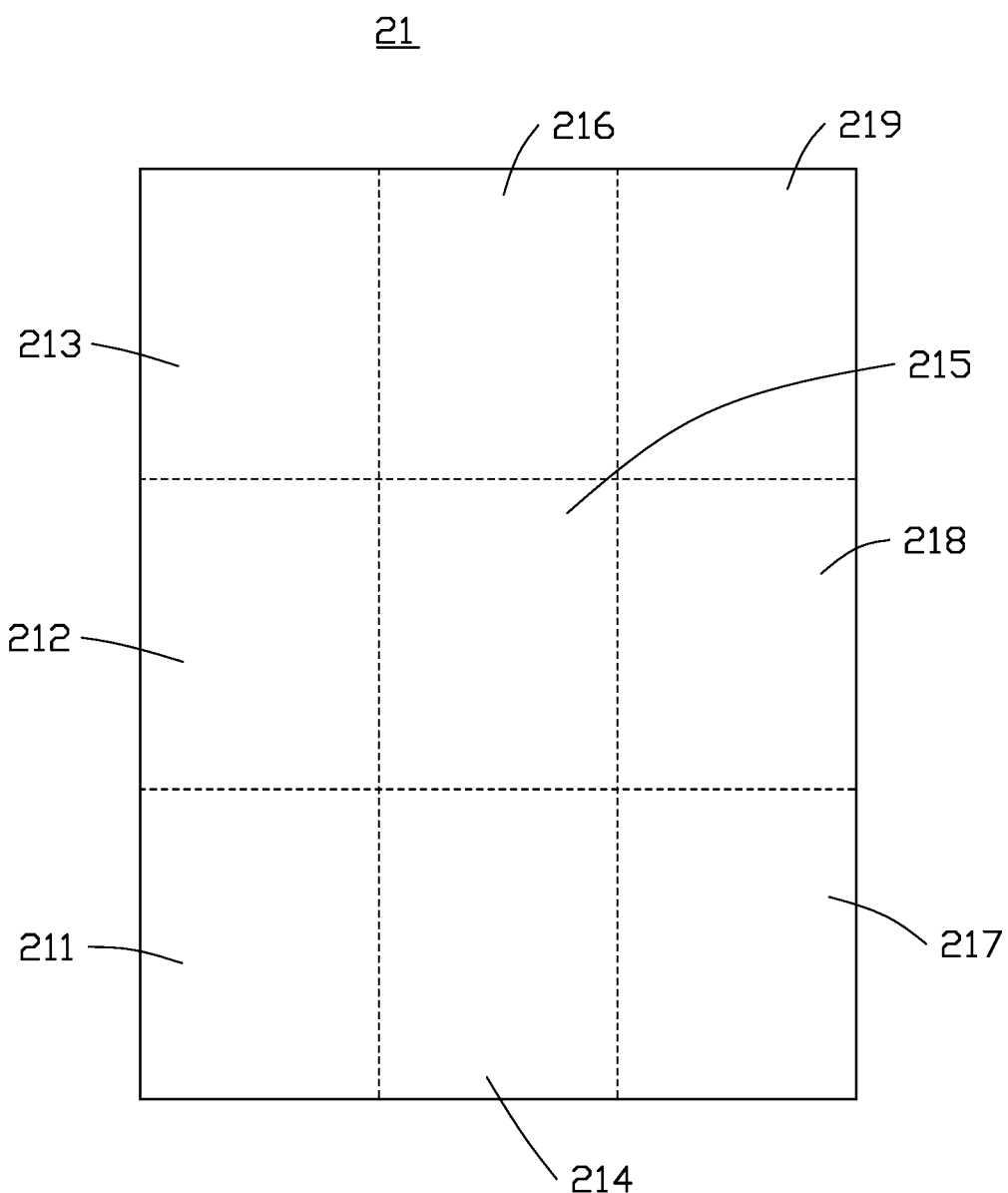
FIG. 3 is a schematic diagram of a division of an image of the front of a product into areas, of an embodiment of the present disclosure.

Referring to FIG. 3, when the front 21 of the product 20 is detected by the detecting device 10, the front 21 is divided into a first front 211, a second front 212, a third front 213, a fourth front 214, a fifth front 215, a sixth front 216, a seventh front 217, an eighth front 218, and a ninth front 219, as FIG. 3 shows. The first front 211, the second front 212, and the third front 213 are arranged along the length direction of the product 20, and the first front 211, the fourth front 214 and the seventh front 217 are arranged along the width direction of the product 20.

In another embodiment, the front 21 can also be divided into other areas, as long as the relationship with the number of the camera members 1331 is satisfied.

Figure 4:
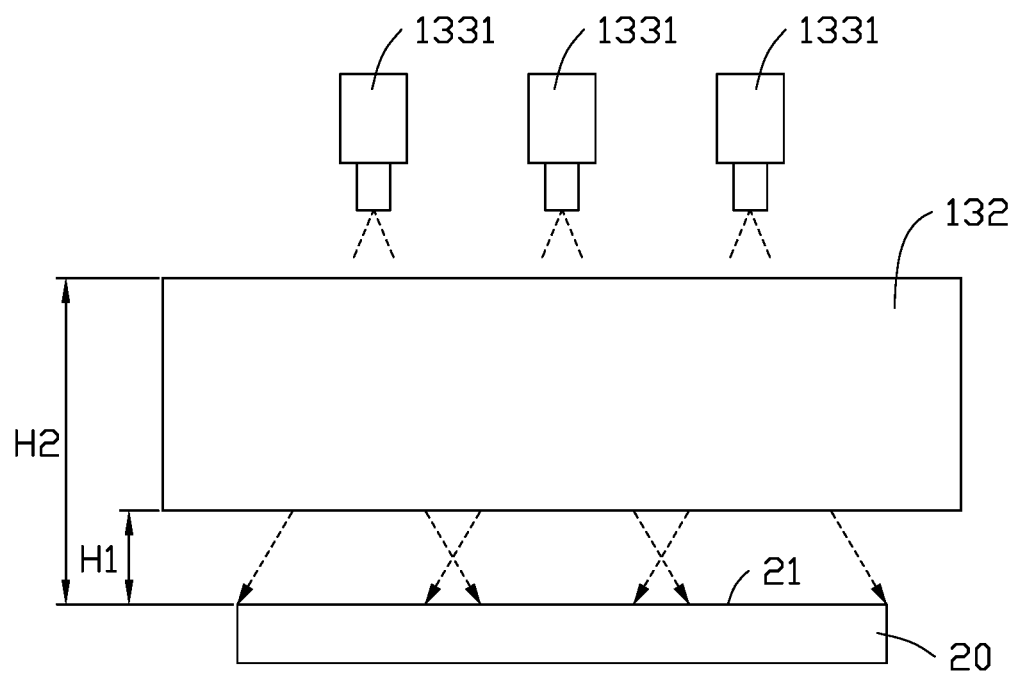
FIG. 4 is a schematic diagram of a camera assembly, a blue light source, and the product, in an embodiment of the present disclosure.

Referring to FIG. 4, in one embodiment, the detecting device 10 satisfies the relationship: $H1=(0.4\sim0.9)*[(a+b)/2]$.

H1 is the distance from the blue light source 132 to the front 21 of the product 20, a is the length of the product 20, and b is the width of the product 20.

In another embodiment, the detecting device 10 satisfies the relationship $H2=(0.8\sim1.7)*[(a+b)/2]$.

H2 is the distance from each camera member 1331 to the front 21 of the product 20, a is the length of the product 20, and b is the width of the product 20.

In the embodiment, the distance between each camera member 1331 in the detecting mechanism 13 and the front 21 of the product 20 is configured to achieve optimal image-taking.

In one embodiment, each camera member 1331 is a fixed focus device and the focal length ranges are 6 mm~12 mm, such as 6 mm, 7 mm, 8 mm, 9 mm, 10 mm, 11 mm and 12 mm.

In one embodiment, the camera members 1331 are exposed for the same period, the exposure range of each camera member 1331 is 4000 μs~5000 μs, such as 4000 μs, 4500 μs, or 5000 μs.

Therefore, the exposure of the camera members 1331 are configured to achieve a better image taking effect.

In one embodiment, the brightness range of the blue light source 132 is 7800 lm~8200 lm, such as 7800 lm, 8000 lm and 8200 lm.

Therefore, the brightness of the blue light source 132 is configured to achieve a better image taking effect.

Referring to FIG. 3 and FIG. 4, the detection process of the detecting device 10 is generally as follows:

First, the transmitting belt 112 transports the product 20 to the position where the detecting mechanism 13 is located, and turns on the blue light source 132.

Then, the moving member 123 is driven to move on the guiding rail 1222 manually or through power components (such as cylinder or motor), so that the light emitted by the blue light source 132 covers the first front 211, the fourth front 214, and the seventh front 217 respectively. At this time, the images of the first front 211, the fourth front 214, and the seventh front 217 of the front 21 are obtained through three camera members 1331. The moving member 123 is driven to continue to move on the guiding rail 1222 manually or through power components (such as cylinder or motor), so that the light emitted by the blue light source 132 covers the second front 212, the fifth front 215 and the eighth front 218 respectively. At this time, the images of the second front 212, the fifth front 215, and the eighth front 218 in the front 21 are obtained respectively through the three camera members 1331. The moving member 123 is driven to continue to move on the guiding rail 1222 manually or through power components (such as cylinder or motor), so that the light emitted by the blue light source 132 covers the third front 213, the sixth front 216, and the ninth front 219 respectively. At this time, the images of the third front 213, the sixth front 216, and the ninth front 219 in the front 21 are obtained respectively through the three camera members 1331.

The processor 14 preprocesses the obtained images of the first front 211, the second front 212, the third front 213, the fourth front 214, the fifth front 215, the sixth front 216, the seventh front 217, the eighth front 218, and the ninth front 219, and determines the presence of any defects as aforesaid in the front 21.

In another embodiment, the order in which the images are obtained by the camera members 1331 can be changed as long as the camera members 1331 can obtain its image when the light emitted by the blue light source 132 covers the corresponding front part.

Those of ordinary skill in the art should realize that the above embodiments are only used to illustrate the present disclosure, but not to limit the present disclosure. As long as they are within the essential spirit of the present disclosure, the above embodiments are appropriately made. Changes and changes fall within the scope of protection of the present disclosure.

What is claimed is:

1. A detecting device configured for detecting a surface of a product, the detecting device comprising:
   a supporting mechanism;
   a transmitting mechanism carrying and transmitting the product; wherein an upward side of the product is a front of the product;
   a detecting mechanism comprising a detecting frame, a blue light source, and a camera assembly, and wherein the detecting frame is arranged on the supporting mechanism to move along a first direction and a second direction perpendicular to the first direction, the blue light source is connected to the detecting frame; the blue light source emits light perpendicular to a front of the product and projected on the front of the product, the camera assembly comprises a plurality of camera members, and the camera members are arranged along the second direction; wherein an image capturing direction of the camera members are perpendicular to the front of the product, and the camera assembly obtains an image of the front of the product when the blue light source is projecting light; and
   a processor connecting to the camera assembly and pre-processing the image captured by the camera assembly, the processor obtaining a detection result of the image.

2. The detecting device of claim 1, wherein:
   each of the camera members is fixed focus with a focal length ranges from 6 mm to 12 mm.

3. The detecting device of claim 1, wherein:
   exposure of the plurality of the camera members are the same, and an exposure range of each of the camera members is between 4000 μs and 5000 μs.

4. The detecting device of claim 1, wherein:
   brightness range of the blue light source is from 7800 lm to 8200 lm.

5. The detecting device of claim 1, wherein:
   the detecting device is adjustable to satisfy a relationship of H1=(0.4~0.9)*[(a+b)/2];
   wherein H1 is a distance from the blue light source to the front of the product, a is a length of the product, and b is a width of the product.

6. The detecting device of claim 5, wherein:
   the detecting device is further adjustable to satisfy the relationship of H2=(0.8~1.7)*[(a+b)/2];
   wherein H2 is a distance from each camera member to the front of the product.

7. The detecting device of claim 1, wherein:
   the supporting mechanism comprises a supporting platform, a supporting frame, and a moving member, the supporting frame is connected to the supporting platform, the supporting frame comprises a guiding rail, and the guiding rail is parallel to the first direction; the moving member is slidably connected to the guiding rail, and the detecting frame is connecting to the moving member.

8. The detecting device of claim 7, wherein:
   the transmitting mechanism comprises a transmitting bracket and a transmitting belt, and the transmitting bracket is arranged on the supporting platform and is located between two gantry carriages, the transmitting belt is arranged on the transmitting bracket, and the transmitting belt is configured to carry and move the product in the first direction.

9. The detecting device of claim 8, wherein:
   the detecting frame comprises a first detecting rack and a second detecting rack; the first detecting rack is connected to the moving member, and the camera members are connected to the first detecting rack, the second detecting rack is slidably connected to the first detecting rack along the third direction, the blue light source is arranged on the second detecting rack, and the third direction, the first direction and the second direction are perpendicular to each other.

10. The detecting device of claim 9, wherein:
    the first detecting rack comprises a first detecting rod, a detecting track and an adjusting member, the first detecting rod is connected to the moving member, the detecting track is connected to the first detecting rod, an extension direction of the detecting track is parallel to the third direction, a first end of the adjusting member is slidably connected to the detecting track, a second end of the adjusting member is connected to the camera members; wherein the adjusting member comprises three adjusting blocks, and each of the three adjusting blocks is connected to a corresponding one of the plurality of camera members.

11. A detecting device configured for detecting a surface of a product, the detecting device comprising:
a supporting mechanism;
a transmitting mechanism carrying and transmitting the product; wherein an upward side of the product is a front of the product;
a detecting mechanism comprising a detecting frame, a blue light source, and a camera assembly, and wherein the detecting frame is arranged on the supporting mechanism to move along a first direction and a second direction perpendicular to the first direction, the blue light source is connected to the detecting frame; the blue light source emits light perpendicular to a front of the product and projected on the front of the product, the camera assembly comprises a plurality of camera members, and the camera members are arranged along the second direction; wherein an image capturing direction of the camera members are perpendicular to the front of the product, and the camera assembly obtains an image of the front of the product when the blue light source is projecting light; and
a processor connecting to the camera assembly and pre-processing the image captured by the camera assembly, the processor obtaining a detection result of the image;
wherein the supporting mechanism comprises a supporting platform, a supporting frame, and a moving member, the supporting frame is connected to the supporting platform, the supporting frame comprises a guiding rail, and the guiding rail is parallel to the first direction; the moving member is slidably connected to the guiding rail, and the detecting frame is connecting to the moving member;
wherein each of the plurality of the camera members has a same exposure.

12. The detecting device of claim 11, wherein:
each of the camera members is fixed focus with a focal length ranges from 6 mm to 12 mm.

13. The detecting device of claim 11, wherein:
brightness range of the blue light source is from 7800 lm to 8200 lm.

14. The detecting device of claim 11, wherein:
the detecting device is adjustable to satisfy a relationship of H1=(0.4~0.9)*[(a+b)/2];
wherein H1 is a distance from the blue light source to the front of the product, a is a length of the product, and b is a width of the product.

15. The detecting device of claim 11, wherein:
the detecting device is further adjustable to satisfy the relationship of H2=(0.8~1.7)*[(a+b)/2];
wherein H2 is a distance from each camera member to the front of the product.

16. The detecting device of claim 11, wherein:
the transmitting mechanism comprises a transmitting bracket and a transmitting belt, and the transmitting bracket is arranged on the supporting platform and is located between two gantry carriages, the transmitting belt is arranged on the transmitting bracket, and the transmitting belt is configured to carry and move the product in the first direction.

17. The detecting device of claim 16, wherein:
the detecting frame comprises a first detecting rack and a second detecting rack; the first detecting rack is connected to the moving member, and the camera members are connected to the first detecting rack, the second detecting rack is slidably connected to the first detecting rack along the third direction, the blue light source is arranged on the second detecting rack, and the third direction, the first direction and the second direction are perpendicular to each other.

18. The detecting device of claim 17, wherein:
the first detecting rack comprises a first detecting rod, a detecting track and an adjusting member, the first detecting rod is connected to the moving member, the detecting track is connected to the first detecting rod, an extension direction of the detecting track is parallel to the third direction, a first end of the adjusting member is slidably connected to the detecting track, a second end of the adjusting member is connected to the camera members; wherein the adjusting member comprises three adjusting blocks, and each of the three adjusting blocks is connected to a corresponding one of the plurality of camera members.

* * * * *